(12) United States Patent
Roth et al.

(10) Patent No.: US 9,517,769 B2
(45) Date of Patent: Dec. 13, 2016

(54) MOTOR VEHICLE

(71) Applicant: AUDI AG, Ingolstadt (DE)

(72) Inventors: Erwin Roth, Wolnzach (DE); Rudolf Leinfelder, Eichstaett (DE); Matthias Burger, Koesching (DE); Ulrich Hammes, Vohburg (DE); Chao Chen, Munich (DE); David Lenz, Munich (DE); Pascal Minnerup, Neufahrn (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/888,095

(22) PCT Filed: Jun. 17, 2014

(86) PCT No.: PCT/EP2014/001641
§ 371 (c)(1),
(2) Date: Oct. 30, 2015

(87) PCT Pub. No.: WO2014/202206
PCT Pub. Date: Dec. 24, 2014

(65) Prior Publication Data
US 2016/0194006 A1    Jul. 7, 2016

(30) Foreign Application Priority Data
Jun. 21, 2013   (DE) .................. 10 2013 010 452

(51) Int. Cl.
*B62D 15/02*   (2006.01)
*B60W 30/18*   (2012.01)
(Continued)

(52) U.S. Cl.
CPC .... *B60W 30/18009* (2013.01); *B60K 31/0008* (2013.01); *B60W 30/18181* (2013.01);
(Continued)

(58) Field of Classification Search
CPC .............. B60W 30/18009; B60W 2050/0064; B60W 30/18181; B60K 31/0008; B62D 15/0285; B62D 1/04; G01S 19/40; G01S 2013/9325
(Continued)

(56) References Cited

U.S. PATENT DOCUMENTS

2002/0177935 A1   11/2002 Winner et al.
2003/0055538 A1   3/2003  Yanaka
(Continued)

FOREIGN PATENT DOCUMENTS

DE  102008051982   6/2009
DE  102008019346   9/2009
(Continued)

OTHER PUBLICATIONS

WIPO English language translation of the International Preliminary Report on Patentability for PCT/EP2014/001641, mailed on Dec. 23, 2015, 7 pages.
(Continued)

*Primary Examiner* — Dalena Tran
(74) *Attorney, Agent, or Firm* — Staas & Halsey LLP (57) ABSTRACT

A motor vehicle has a control device to control automated longitudinal and/or transverse guidance of the motor vehicle within the scope of a specific driving maneuver. The motor vehicle also has an operator control element to communicate with the control device and to transfer control information, relating to the at least partially automated longitudinal and/or transverse guidance, to the control device. The control device is configured in such a way that activation or deactivation of the longitudinal and/or transverse guidance can be controlled by means of an operator-side first operator-control action at the operator-control element, and at least one driving parameter which influences the longitudinal
(Continued)

and/or transverse guidance of the motor vehicle, controlled by the control device, can be modified by means of an additional operator-side, second operator-control action at the operator-control element, which second operator-control action is in particular different from the first operator-control action.

22 Claims, 3 Drawing Sheets

(51) Int. Cl.
    *B60K 31/00*     (2006.01)
    *B62D 1/04*     (2006.01)
    *B60K 26/02*     (2006.01)
    *B60W 50/00*     (2006.01)

(52) U.S. Cl.
    CPC ........... *B62D 1/04* (2013.01); *B62D 15/0285* (2013.01); *B60K 2026/029* (2013.01); *B60W 2050/0064* (2013.01)

(58) Field of Classification Search
    USPC ...... 701/2, 23, 24, 300, 110, 42, 79, 41, 93; 340/435; 342/457, 458, 455; 180/401
    See application file for complete search history.

(56) References Cited

U.S. PATENT DOCUMENTS

| | | | |
|---|---|---|---|
| 2009/0287367 A1 | 11/2009 | Salinger | |
| 2010/0256852 A1* | 10/2010 | Mudalige | G08G 1/22 701/24 |
| 2014/0121883 A1* | 5/2014 | Shen | B62D 15/0285 701/28 |
| 2015/0088360 A1 | 3/2015 | Bonnet et al. | |

FOREIGN PATENT DOCUMENTS

| | | |
|---|---|---|
| DE | 102008001842 | 11/2009 |
| DE | 102009008142 | 8/2010 |
| DE | 102010005327 | 7/2011 |
| DE | 102010056064 | 6/2012 |
| DE | 102012008858 | 11/2012 |
| DE | 10 2013 010 452.1 | 6/2013 |
| WO | 2012/168037 | 12/2012 |
| WO | PCT/EP2014/001641 | 6/2014 |

OTHER PUBLICATIONS

German Office Action for German Priority Patent Application No. 10 2013 010 452.1, issued Jun. 30, 2014, 4 pages.
English language International Search Report for PCT/EP2014/001641, mailed on Oct. 20, 2014, 2 pages.

* cited by examiner

MOTOR VEHICLE

CROSS REFERENCE TO RELATED APPLICATIONS

This application is based on and hereby claims priority to International Application No. PCT/EP2014/001641 filed on Jun. 17, 2014 and German Application No. 10 2013 010 452.1 filed on Jun. 21, 2013, the contents of which are hereby incorporated by reference.

BACKGROUND

The invention relates to a motor vehicle comprising a control device which is designed to control at least partially automated longitudinal and/or transverse guidance of the motor vehicle within the scope of a specific driving maneuver, and at least one operator control element which is designed to communicate with the control device and to transfer control information, relating to the at least partially automated longitudinal and/or transverse guidance, to the control device.

Motor vehicles with such control devices, which are implemented, in particular in corresponding driver assistance systems for longitudinal and/or transverse guidance of a motor vehicle, are known per se. The longitudinal and/or transverse guidance of the motor vehicle is usually controlled here by an operator control element which communicates with the control device and by which corresponding control information is transferred to the control device.

Within the scope of the control of the longitudinal and/or transverse guidance which takes place by the operator control element it is generally necessary for an operator to execute a specific operator control action at or with the operator control element. For example it may be necessary for an operator to operate an operator-control-element-side pushbutton key continuously in order to transmit corresponding control information to the control device, on the basis of which control information the longitudinal and/or transverse guidance is activated or remains activated. The execution of the longitudinal and/or transverse guidance is therefore subsequently linked directly to the operator control action by the operator. If the operator ends or interrupts the operator control action, i.e. for example in that the operator cancels the activation of the pushbutton key in the above-mentioned example, the longitudinal and/or transverse guidance is interrupted immediately.

Apart from the possibility of interrupting the longitudinal and/or transverse guidance, until now the operator has not been able to influence the operation of the longitudinal and/or transverse guidance by the operator control element while they were being carried out.

SUMMARY

One possible object is to specify a motor vehicle having a control device for the at least partially automated longitudinal and/or transverse guidance, which permits the operation of the longitudinal and/or transverse guidance to be influenced while they are being carried out.

The inventors propose a motor vehicle comprising a control device which is designed to control at least partially automated longitudinal and/or transverse guidance of the motor vehicle within the scope of a specific driving maneuver, and at least one operator control element which is designed to communicate with the control device and to transfer control information, relating to the at least partially automated longitudinal and/or transverse guidance, to the control device. The control device is configured in such a way that activation or deactivation of the longitudinal and/or transverse guidance can be controlled by an operator-side first operator control action at the operator control element, and at least one driving parameter which influences the longitudinal and/or transverse guidance of the motor vehicle, which is controlled by the control device, can be modified by an additional operator-side second operator control action which is, in particular, different from the first operator control action, at the operator control element.

The inventor proposes a motor vehicle having a control device for the at least partially automated longitudinal and/or transverse guidance of the motor vehicle within the scope of a specific driving maneuver. A corresponding driving maneuver is understood to be, for example, a parking process. However, the principle can also be transferred to other driving maneuvers which can be brought about with at least partially automated longitudinal and/or transverse guidance. The core of the proposal is the particular possibility of controlling the longitudinal and/or transverse guidance. There is provision that by the operator control element not only the activation or deactivation of the longitudinal and/or transverse guidance can be performed but additionally, i.e. in particular also during the execution of the longitudinal and/or transverse guidance, the possibility is provided of influencing the longitudinal and/or transverse guidance, i.e. of influencing, in particular, at least one driving parameter which influences said longitudinal and/or transverse guidance. The longitudinal and/or transverse guidance of the motor vehicle can accordingly be adapted to the subjective sensation of safety of the operator, i.e. in particular of the driver, by modifying or influencing corresponding driving parameters while the longitudinal and/or transverse guidance of the motor vehicle are being carried out.

For this purpose, the control device, which can basically constitute part of a driver assistance system for the at least partially automated longitudinal and/or transverse guidance, is configured in such a way that activation or deactivation of the longitudinal and/or transverse guidance takes place by a first operator control action at or with the operator control element, and at least one driving parameter is modified or influenced within the scope of the control, carried out by the control device, of the longitudinal and/or transverse guidance by a second operator control action at or with the operator control element.

The operator control actions which are executed on the operator side at or with the operator control element are thus sensed by the control device or a sensor system associated therewith, or sensed operator control actions are transmitted to the control device, evaluated by the control device and correspondingly converted into activation or deactivation of the longitudinal and/or transverse guidance of the motor vehicle or subsequently into modification or influencing of a corresponding driving parameter.

Between the operator control element and the control device there is a communication link, with the result that the operator control actions which are executed at the operator control element can be detected and processed by the control device. The operator control element therefore generally is or comprises an interface between the control device and an operator, via which interface corresponding control information (control instructions) which are provided on the operator side at or with the operator control element and relate to the at least partially automated longitudinal and/or transverse guidance, can be transferred to the control device.

The first operator control action and the second operator control action are accordingly to be carried out by an operator, i.e. in particular the driver. An operator control action is typically to be understood as being a specific action by an operator at or with the operator control element. An operator control action therefore relates, in particular, to operator-side activations and/or movements of the operator control element or of operator control sections which are provided on the operator control element.

The second operator control action is to be carried out in addition to the first operator control action. This arises from the fact that the activation or deactivation of the longitudinal and/or transverse guidance is linked to the first operator control action. The longitudinal and/or transverse guidance is activated only when the first operator control action is carried out, with the result that modification or influencing of a corresponding driving parameter by the second operator control action is possible only under this condition. If the first operator control action is no longer executed or carried out, the longitudinal and/or transverse guidance is immediately interrupted.

The second operator control action is generally different from the first operator control action. The operator control actions can therefore relate, for example, to different degrees of freedom of activation or movement of the operator control element or of operator control sections which are provided on the operator control element. For example, a first operator control action can relate to a translational degree of freedom of movement and/or a second operator control action can relate to a rotational degree of freedom of movement of the operator control element.

However, it is also conceivable that the operator control actions are similar, i.e. are in particular of the same type or in the same direction. It is therefore possible, for example, that a first operator control action is as a movement of the operator control element starting from a home position into a first operator control position, and a second operator control action is a further movement, of the same type and in the same direction, of the operator control element starting from the first operator control position. The second operator control action can be characterized here, in particular, by virtue of the fact that as a result of said second operator control action a movement of the operator control element takes place starting from a first operator control position into a second operator control position.

The driving parameter which can be modified or influenced by the second operator control action may be, for example, the velocity of the motor vehicle within the scope of the at least partially automated longitudinal and/or transverse guidance. However, it is also conceivable that the driving parameter relates to a specific speed profile with which a specific driving maneuver is to be executed within the scope of the longitudinal and/or transverse guidance.

The operator control element can be installed on the motor vehicle side. The operator control element is in this case mechanically connected to the motor vehicle. The arrangement of the operator control element is typically inside the motor vehicle here. The arrangement and orientation of the operator control element is expediently selected in such a way that the operator control element can be controlled well by an operator, i.e. in particular controlled well with the operator's hand. The operator control element can therefore be arranged, for example, in the center console of a motor vehicle.

Alternatively or, if appropriate, additionally, the or an operator control element can also be portable. In this case, the operator control element is not mechanically connected to the motor vehicle but instead carried by an operator. There is a communication link between the operator control element and the motor vehicle. The operator control element is typically integrated here into an operator-side electronic device, i.e. an electronic device which is carried by an operator. The electronic device may be, for example, a device having a mobile transmitter and/or receiver device, such as, for example, a mobile phone, a smartphone, a tablet or tablet computer, a radio key etc.

In the text which follows, exemplary first and second operator-side operator control actions and expedient exemplary embodiments of the operator control element which are associated therewith will be explained.

For example, the first operator control action can be a translational movement of the operator control element along a translational axis starting from a home position into a first operator control position, and the second operator control action can be a rotational movement of the operator control element, located in the first operator control position, about the translational axis or another rotational axis. In this exemplary embodiment, the operator control element preferably is or comprises what is referred to as a rotary-push actuator element, i.e. an actuator element which can be moved in two different degrees of freedom, i.e., on the one hand, translationally and, on the other hand, rotationally.

In this exemplary embodiment, the two operator control actions are different. The first operator control action is a translation of the operator control element along a translational axis starting from a home position into a first operator control position. The second operator control action is a rotation of the operator control element, located in the first operator control position, about a rotational axis, preferably the translational axis, in or counter to the clockwise direction. Consequently, a translational movement of the operator control element along the translational axis starting from the home position into the first operator control position brings about activation of the longitudinal and/or transverse guidance. The first operator control action can therefore be carried out, in particular, by pressing the operator control element. The modification or influencing of the driving parameter is carried out by a rotational movement of the operator control element, located in the first operator control position, about a rotational axis, in particular the translational axis, in or counter to the clockwise direction. The second operator control action can thus be carried out, in particular, by rotating the pressed operator control element.

It is also possible that the first operator control action is a translational movement of the operator control element along a translational axis starting from a home position into a first operator control position, and the second operator control action is a further translational movement of the operator control element in the same direction along the translational axis starting from the first operator control position. In this exemplary embodiment, the operator control element preferably is or comprises what is referred to as a push-type actuator element, i.e. an actuator element which can be moved in one or more translational degrees of freedom. Of course, this exemplary embodiment can also be implemented by an above-mentioned rotary-push actuator element.

The two operator control actions are similar in this exemplary embodiment insofar as they both involve a translational movement along the same translational axis. The difference between the operator control actions is in the starting points of the respective translational movements. The starting point for the first operator control action is the home position of the operator control element, and the starting point for the second operator control action is the first operator control position. The first operator control action is accordingly a translation of the operator control element starting from the home position into the first operator control position. The second operator control action is a further translation of the operator control element in the same direction starting from the first operator control position. The second operator control action can lead into a second operator control position, with the result that the second operator control action is detected as such, and correspondingly implemented, only when the second operator control position is reached. Consequently, a translational movement of the operator control element along the translational axis starting from the home position into the first operator control position brings about activation of the longitudinal and/or transverse guidance. The first operator control action can thus be carried out, in particular, by pressing the operator control element. The modification or influencing of the driving parameter is carried out by a further translational movement of the operator control element in the same direction along the translational axis starting from the first operator control position. The second operator control action can thus be carried out, in particular, by further pressing of the operator control element, in the same direction, if appropriate with increased application of force. The second operator control action can, as mentioned, require pressing of the operator control element as far as into a second operator control position.

It is also conceivable that the first operator control action is a translational movement of an operator control section of the operator control element along a translational axis starting from a home position into a first operator control position, and the second operator control action is a pivoting movement of the operator control element, with the operator control section located in the first operator control position, about a bearing point starting from a home position. In this exemplary embodiment, the operator control element preferably is or comprises a lever element with a translationally movable operator control section arranged thereon. The operator control element is thus an actuator element, which can be pivoted about a pivoting axis, formed, in particular, by a bearing point, with an operator control section which can be moved translationally thereon. A first degree of freedom is the translation of the operator control section of the operator control element, and a second degree of freedom is the pivoting movement of the entire operator control element.

In this exemplary embodiment, the two operator control actions differ in a way similar to the first-mentioned exemplary embodiment. The first operator control action is a translation of the operator control section, which is arranged in a translationally movable fashion on the operator control element, along a translational axis starting from a home position into a first operator control position. The second operator control action is a pivoting movement of the operator control element, with the operator control section located in the first operator control position, about a bearing point starting from a home position. The pivoting movement of the operator control element can also lead here to a second operator control position with the result that the second operator control action is detected as such and correspondingly implemented only when the second operator control position is reached. Consequently, a translational movement of the operator control section along the translational axis starting from the home position into the first operator control position brings about activation of the longitudinal and/or transverse guidance. The first operator control action can thus be carried out, in particular, by pressing an operator control section which is embodied as a knob, pushbutton key or the like. The modification or influencing of the driving parameter is carried out by a pivoting movement of the operator control element, with the operator control section located in the first operator control position, about a bearing point which supports the latter. The second operator control action can thus be carried out, in particular, by pivoting the operator control element about the bearing point with the operator control section pressed.

The exemplary embodiments described above relate, in particular, to an operator control element which is installed on the motor vehicle side and is in the form of a rotary-push actuator element, push-type actuator element or lever element. As mentioned, the operator control element can be arranged, for example, in the region of the center console.

The first operator control action can also be a movement to a first operator control position on a touch-sensitive operator control surface of an operator control element, and the second operator control action can be a movement along the operator control surface, starting from the first operator control position. In this exemplary embodiment, the operator control element preferably is or comprises a touch-sensitive operator control surface, for example, in the form of what is referred to as a touch screen. Movements in different degrees of freedom can be executed on the touch-sensitive operator control surface of the operator control element.

In this exemplary embodiment, the two operator control actions differ in that the first operator control action potentially involves only touching of the operator control surface of the operator control element, and the second operator control action is movement on the operator control surface starting from the first operator control position, defined by the first operator control action, on the operator control surface. The first operator control action corresponds to the first point of contact with the operator control surface. The second operator control action can thus be one or more translational movements, one or more rotational movements or mixtures of corresponding translational and rotational movements, for example arcuate movements, on the operator control surface. Consequently, touching the operator control surface of the operator control element brings about activation of the longitudinal and/or transverse guidance. Of course, it may be the case that the operator control element firstly has to be configured specifically for this, i.e., for example, a specific operator control program for controlling the control device has to be started. The first operator control action can thus be carried out, in particular, by touching the operator control surface with a finger, a pen or some other object. The modification or influencing of the driving parameter is carried out, for example, by a specific movement on the operator control surface starting from the point of contact at which the operator control surface was previously touched. The second operator control action can thus be carried out, in particular, by moving or drawing or "wiping", for example, the finger (obliquely) upward, (obliquely) downward, (obliquely) to the left or (obliquely) to the right on or along the operator control surface.

The last-mentioned exemplary embodiment relates, in particular, to a portable operator control element, for example in the form of a mobile phone, smartphone, tablet or tablet computer or the like. Basically, the described movements can be implemented on an operator-control-element-side operator control surface, and alternatively or additionally also by movements of an operator control section such as, for example, a movably mounted knob or a movably mounted pushbutton key, of a corresponding portable operator control element.

In one development, the operator control element can comprise a resetting device which forms a resetting force counter to the second operator control action. It is therefore possible that the first operator control action can (also) differ from the second operator control action in that the second operator control action is to be executed counter to a corresponding resetting force. In this way it is possible to make the execution of the second operator control action haptically better detectable for the operator. The resetting force does not have to be static but can also, for example, change, i.e. increase or decrease, as a function of the type and duration of the second operator control action. Referring to the exemplary embodiment described above, in which the second operator control action is a rotational movement of the operator control element, it is, for example, possible that the resetting force increases with an increasing distance covered in terms of angle within the scope of the rotational movement of the operator control element. The principle can, of course, be transferred to the described exemplary embodiment of the second operator control action in the form of a further translational movement or pivoting movement in the same direction. The principle can also be transferred to the described exemplary embodiment of the second operator control action in the form of a movement on or over a touch-sensitive operator control surface. The resetting device can be, for example, an actuator which can be operated by motor, is coupled to the operator control element and can form a corresponding resetting force which is directed counter to a second operator control action. It is also conceivable, for example, for the operator control element to be implemented as a spring which is coupled to the operator control element in such a way that its spring force is directed counter to the second operator control action.

It is conceivable that the resetting force can be varied as a function of vehicle surroundings information which is acquired, in particular during the driving maneuver, by a vehicle surroundings sensor system which communicates with the control device. The resetting force can thus be modified as a function of corresponding vehicle surroundings information, i.e. the informative content thereof. The advantage of this exemplary embodiment is that in the case of driving maneuvers in complex or generally difficult driving or traffic situations which can be mapped by the vehicle surroundings information the modification or influencing of the driving parameter by the second operator control action can be associated, for example, with a high collision possibility. The movements which are to be carried out on the operator side within the scope of the second operator control action can accordingly be made more difficult by the formation of a resetting force, with the result that the operator under certain circumstances does not implement said resetting force, or only to a reduced degree. In exceptional cases it is also conceivable that modification or influencing of the driving parameter which is to be performed is cancelled by the second operator control action as a function of the vehicle surroundings information, since said modification or influencing entails an excessively high collision possibility. The vehicle surroundings sensor system which communicates with the control device is a motor-vehicle-side device by which, for example, it is possible to estimate or detect hazardous situations, in particular collision possibilities with objects located in the surroundings of the vehicle, i.e., for example, road users or other obstacles.

The control device can expediently be designed to take into account a limiting value for the driving parameter within the scope of a modification of the driving parameter, which limiting value cannot be exceeded by the second operator control action. This particular development also permits safer control of the longitudinal and/or transverse guidance, i.e. in particular safer performance of modifications or influencing of the driving parameter by the second operator control action. A plurality of variables, i.e. additional variables or peripheral conditions in addition to the modification or influencing performed by the second operator control action, can thus be included in the actual modification of the driving parameter. In particular, the possibility of modifying or influencing the driving parameter by the second operator control action can be limited in such a way that said modification or influencing is possible only within a certain, driving-parameter-specific limiting range, in order to avoid exceeding or undershooting a certain, driving-parameter-specific limiting value.

The use of a corresponding limiting value may be expedient, in particular, when the driving parameter is the velocity of the motor vehicle which is set within the scope of the longitudinal and/or transverse guidance. In this case, the limiting value is typically a limiting velocity.

The limiting velocity may be predefined and/or may be adapted as a function of vehicle surroundings information which is acquired, in particular during the driving maneuver, by a or the vehicle surroundings sensor system which communicates with the control device. The predefinition of the limiting speed can be oriented, for example, according to traffic regulations, with the result that permissible maximum speeds can be used as corresponding limiting velocities. The limiting velocity can be referred here to the permissible maximum speed which applies to the current section of route being travelled on. For this purpose, the control device can access, for example, route data which is stored in a memory. The limiting velocity can, however, also be adapted as a function of the current traffic situation, which is in turn modeled by corresponding vehicle surroundings information, with the result that in the case of complex traffic situations the limiting velocity is set to relatively low values, and in the case of less complex traffic situations it is set to relatively high values.

A further advantageous embodiment provides that the control device is configured in such a way that when the first operator control action is carried out, a predefined value of the driving operating parameter is continually preset. The value which is predefined by the first operator control action when the longitudinal and/or transverse guidance is activated is typically a specific output value which permits modification or influencing of the driving parameter both upward and downward. Following the example of the velocity as a corresponding driving parameter, the predefined value, for example within the scope of an at least partially automated parking process, can be, for example, 5 km/h. The operator, i.e. in particular the driver, therefore has the possibility, by performing a corresponding second operator control action, of increasing or decreasing the velocity which is implemented by the control device within the scope of the longitudinal and/or transverse guidance for the parking process. Of course, the preset value can be modified on the operator side, i.e. the operator can himself decide the value of the preset value within the scope of a specific, at least partially automated driving maneuver when the longitudinal and/or transverse guidance is activated.

In addition, the operator control element can comprise an output device for outputting acoustic and/or haptic and/or visual signals. Alternatively, the operator control element can be designed to control at least one motor-vehicle-side output device for outputting acoustic and/or haptic and/or visual signals, wherein the signals can be output as a function of vehicle surroundings information which is acquired by a or the vehicle surroundings sensor system which communicates with the control device. Specific signals can thus be output in conjunction with the execution of the longitudinal and/or transverse guidance by the operator control element or its interaction with corresponding motor-vehicle-side output device.

The outputting of corresponding signals is expedient, in particular when the signals are used to alert the operator, i.e. in particular the driver, to specific traffic situations, i.e., for example, specific objects located in the surroundings of the vehicle. The signals can thus advantageously be output as a function of vehicle surroundings information acquired by a or the vehicle surroundings sensor system which communicates with the control device. The vehicle surroundings information models the current vehicle surroundings and thus also includes specific objects which, under certain circumstances, can constitute a hazard for the motor vehicle. Such objects can be, for example, other road users or other, in particular structural, objects. The operator, i.e. in particular the driver, can thus be warned about a possible collision of the motor vehicle with such an object by the transfer of corresponding signals as a function of the vehicle surroundings information. In this context, the control device can, within the scope of the processing of the vehicle surroundings information, access specific collision threshold values with which the vehicle surroundings information can be compared. On the basis of the comparison result, which thus constitutes an evaluation of the vehicle surroundings information, it is possible to decide whether, by which output device and with what intensity one or more corresponding signals are output. Accordingly, in particular, the intensity of the signals can also be varied as a function of the vehicle surroundings information.

Specifically, the modification or influencing of a driving parameter, for example the velocity, which is carried out by a corresponding second operator control action, can be accompanied, for example, by a haptic signal transfer if the operator, i.e. in particular the driver, attempts to increase the velocity in a traffic situation which is correspondingly assessed as critical on the basis of the vehicle surroundings information. The haptic signal transfer comprises, in particular, vibrations or vibration pulses of the operator control element. The haptic signal transfer can, however, also comprise the formation of corresponding resetting forces counter to the second operator control action, which resetting forces can, for example, be implemented by the operator-control-element-side resetting device described above. The attempts, or an attempt, to increase the velocity further by a second, operator-side operator control action can thus be made more difficult by the buildup of a corresponding resetting force.

It is alternatively or additionally also conceivable that the modification or influencing, for example, of the velocity is accompanied, for example, by a visual signal transfer. It is therefore possible that the attempts or an attempt, to modify or influence a driving parameter, i.e., for example, velocity, is associated with outputting, and subsequently, under certain circumstances, modification of the light intensity, light color etc. which originates from an operator-control-element-side and/or motor-vehicle-side lighting device.

As mentioned, an acoustic signal transfer is alternatively or additionally also possible. It is therefore possible that the attempts or an attempt to modify or influence a driving parameter, i.e., for example, the velocity, is associated with outputting and subsequently, under certain circumstances, modification of the sound, sound sequence, rhythm, etc. which originates from an operator-control-element-side and/or motor-vehicle-side loudspeaker device.

The specified output possibilities of corresponding signals are valid both for the embodiment of the operator control element which is installed on the motor vehicle side and for the portable embodiment of the operator control element.

The inventors also propose a method for operating a motor vehicle comprising a control device which controls at least partially automated longitudinal and/or transverse guidance of the motor vehicle within the scope of a specific driving maneuver, and at least one operator control element which communicates with the control device and transfers control information, relating to the at least partially automated longitudinal and/or transverse guidance, to the control device. The method is defined by the fact that activation or deactivation of the longitudinal and/or transverse guidance is controlled by a first operator-side operator control action at or with the operator control element, and at least one driving parameter which influences the driving operation of the motor vehicle, which is controlled by the control device, is modified by an additional second operator-side operator control action which is, in particular, different from the first operator control action, at or with the operator control element.

With respect to the proposed method all the statements relating to the proposed motor vehicle and the possible embodiments and exemplary embodiments described above thereof apply analogously. The method can accordingly be developed in an analogous fashion by the possible embodiments and exemplary embodiments of the motor vehicle described above.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Figure 1:
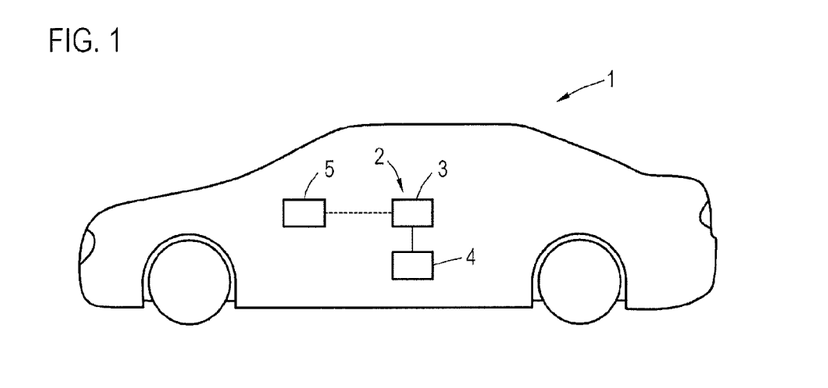
FIG. 1 shows a basic illustration of a motor vehicle according to an exemplary embodiment.

FIG. 1 shows a motor vehicle 1 according to an exemplary embodiment of the proposal. The motor vehicle 1 comprises a driver assistance system 2 for carrying out at least partially automated longitudinal and/or transverse guidance within the scope of a specific driving maneuver such as, for example, an automated parking process (cf. FIG. 5).

The driver assistance system 2 comprises a control device 3. The control device 3 communicates with all the motor-vehicle-side actuators which are relevant for the at least partially automated longitudinal and/or transverse guidance, i.e. in particular the drive assembly or assemblies (not shown), the brake devices (not shown), the steering device (not shown) etc. The communication of the control device 3 with the actuators is carried out via a data network, present on the motor vehicle side, for example in the form of a bus network.

In addition, the control device 3 communicates with a vehicle surroundings sensor system 4. The vehicle surroundings sensor system 4 comprises a plurality of sensors, for example in the form of cameras, which are installed on the motor vehicle side and by which the vehicle surroundings are sensed. The sensor signals which are supplied by the sensors are converted computationally by the vehicle surroundings sensor system 4 into vehicle surroundings information which is transferred to the control device 3.

The longitudinal and/or transverse guidance are carried out on the basis of control information (control instructions) which the driver assistance system 2 or the control device 3 receives from an operator, i.e. in particular the driver. For this purpose, the control device 3 communicates with an operator control element 5 which is designed to communicate with the control device 3 and to transfer corresponding control information, relating to the at least partially automated longitudinal and/or transverse guidance, to the control device 3.

The control information which is transferred to the control device 3 by the operator control element 5 is basically divided into two types. By a first type of control information the longitudinal and/or transverse guidance can be activated or deactivated, and by a second type of control information at least one driving parameter which influences the longitudinal and/or transverse guidance of the motor vehicle 1, which is controlled by the control device 3, can be modified or influenced. The driving parameter is, for example, the velocity or a speed profile of the motor vehicle 1, within the scope of the at least partially automated longitudinal and/or transverse guidance.

The generation of the control information and the resulting control of the longitudinal and/or transverse guidance of the motor vehicle 1 are based on specific operator-side operator control actions at or with the operator control element 5. By an operator-side first operator control action at or with the operator control element 5, the longitudinal and/or transverse guidance can be activated. Correspondingly, the longitudinal and/or transverse guidance can be deactivated by cancelling the first operator control action. By an additional operator-control side second operator control action, which is, in particular, different from the first operator control action, at or with the operator control element 5, the driving parameter, i.e., for example, the velocity of the motor vehicle 1, can be modified or influenced within the scope of the at least partially automated longitudinal and/or transverse guidance.

The modification or influencing of the driving parameter which is possible by the second operator control action can be carried out by taking into account a limiting value for the driving parameter which is to be modified or influenced. This limiting value cannot be exceeded by the second operator control action. The control device 3 is thus designed, within the scope of modification or influencing of the driving parameter, to take into account a limiting value for the driving parameter, which limiting value cannot be exceeded by the second operator control action.

This can be illustrated using the example of the driving parameter in the form of velocity, which can be modified or influenced by a second operator control action. In the control device 3 a corresponding limiting velocity is stored which cannot be exceeded within the scope of the longitudinal and/or transverse guidance in the case of a specific driving maneuver, to be carried out in an at least partially automated fashion, by the second operator control action. The limiting velocity can be, for example, 10 km/h during, for example, a parking process which is carried out in an automated fashion. The setting of the limiting velocity can be oriented according to permissible maximum speeds which are predefined according to the traffic regulations. It is also conceivable that the limiting velocity is set or adapted as a function of the vehicle surroundings information which is determined by the vehicle surroundings sensor system 4. Consequently, the limiting velocity can be set or adapted, for example, by objects which are located in the surroundings of the vehicle, for example in the form of other road users or structural obstacles.

The driver assistance system 2 which is associated with the motor vehicle 1, or the control device 3 of said driver assistance system 2, is therefore defined, in particular, by the fact that the control of the longitudinal and/or transverse guidance can not only be activated or deactivated on the operator side by a corresponding first operator control action, but the operator also has, by a second operator control action which is carried out in addition to the first operator control action, the possibility of modifying or influencing specific driving parameters as required within the scope of the longitudinal and/or transverse guidance. By a corresponding second operator control action, the operator can therefore modify, i.e. decrease or increase, for example, the velocity which is preset within the scope of a specific driving maneuver which is controlled by the control device 3.

Figure 2:
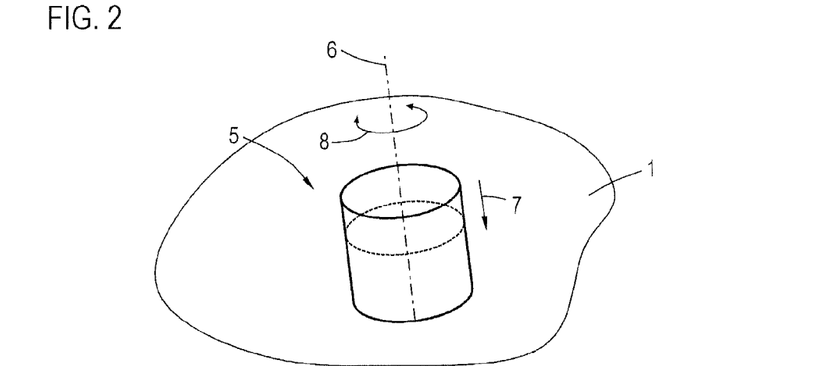
FIGS. 2, 3, 4 each show a basic illustration of an operator control element according to an exemplary embodiment.
Figure 3:
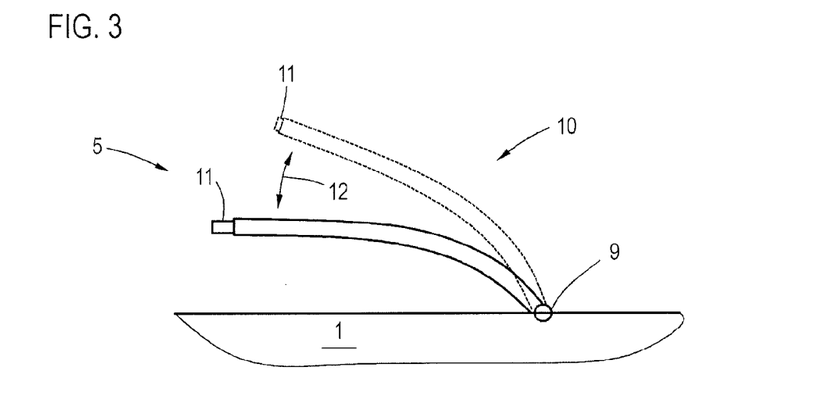
Figure 4:
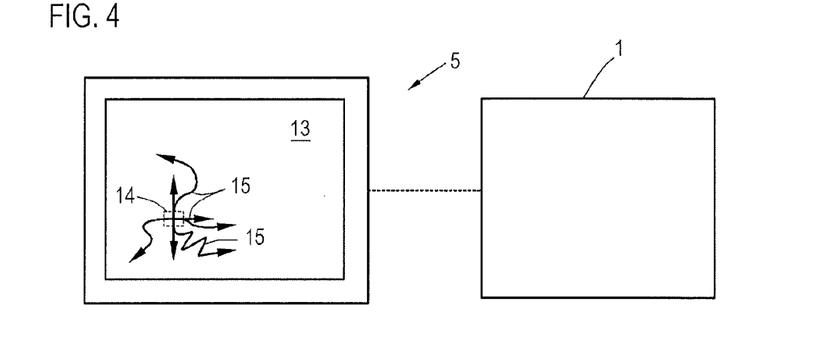

FIGS. 2-4 show basic illustrations of operator control elements 5 according to different exemplary embodiments. Basically, a corresponding operator control element 5 can be installed on the motor vehicle side, i.e. can be permanently connected to the motor vehicle 1, or can be portable, i.e. not permanently connected to the motor vehicle 1. If the operator control element 5 is portable, it has a transmitter and/or receiver device (not shown) by which it can communicate with a motor-vehicle-side, in particular control-device-side, transmitter and/or receiver device (not shown), in order to transfer corresponding control information, resulting from corresponding operator control actions, to the control device 3.

FIG. 2 shows a basic illustration of an operator control element 5 which is embodied as a rotary-push actuator element. The operator control element 5 is installed on the motor vehicle side, for example in the region of the center console. The operator control element 5 can be moved here in two different degrees of freedom of movement. A first degree of freedom of movement (pressing) is given by the possibility of translational movement of the operator control element 5 along a translational axis 6 (cf. arrow 7). A second degree of freedom of movement (rotation) is given by the possibility of rotational movement of the operator control element 5 about the translational axis 6 (cf. double arrow 8).

The first operator control action is defined by translational movement of the operator control element 5 starting from a home position into a first operator control position. The longitudinal and/or transverse guidance is accordingly activated by pressing the operator control element 5 starting from a home position, which typically corresponds to the position of rest of the operator control element 5, into the first operator control position. If the operator control element 5 is located in the first operator control position (cf. dashed illustration), the driving parameter, i.e., for example, velocity, can be modified by rotating the operator control element 5 about the translational axis 6. Rotation of the operator control element 5 in the clockwise direction can bring about, for example, an increase in the driving parameter, i.e., for example, the velocity, and a rotation of the operator control element 5 counter to the clockwise direction can bring about, for example, a reduction in the driving parameter, i.e., for example, the velocity.

The rotation of the operator control element 5 about the translational axis 6 can take place here counter to a resetting force which is applied by a resetting device (not shown). The modification of the driving parameter which is performed by the second operator control action is haptically better perceptible for the operator in this way. The resetting device can be embodied as an electric motor which is coupled to the operator control element 5 and by which a corresponding resetting force is applied to the operator control element 5 when the operator control element 5 is rotated.

The resetting force which is applied by the resetting device can be varied as a function, for example, of the vehicle surroundings information. It is therefore possible that, depending on the informative content of the vehicle surroundings information, a comparatively higher resetting force is generated and applied to the operator control element 5 when the second operator control action is actually carried out or an attempt is made to carry it out. This can be carried out, in particular, if the vehicle surroundings information specifies, if appropriate after comparison with corresponding collision threshold values, an increased collision probability during the actual or attempted increasing of, for example, the velocity, with the result that the application of an increased resetting force, which makes the rotational movement of the operator control element 5 more difficult, can constitute an advantage in terms of safety.

An alternative possible way of implementing a second operator control action will be explained with reference to the exemplary embodiment of an operator control element, in the form of a rotary-push actuator element, which is shown in FIG. 2. instead of rotational movement about the translational axis 6, the second operator control action can also be given by a further translational movement of the operator control element 5 in the same direction starting from the first operator control position. The operator control element 5 is thus moved further translationally in the same direction within the scope of the second operator control action (further pressing). The second operator control action can differ from the first operator control action in that the translational movement of the operator control element 5 within the scope of the second operator control action, i.e. starting from the first operator control position, is carried out counter to a corresponding resetting force. The second operator control position can, if appropriate, be defined in that the operator control element 5 has to be moved starting from the first operator control position into a second operator control position, with the result that corresponding modification or influencing of the driving parameter, i.e., in particular, of the velocity, is not carried out until the second operator control position is reached.

In the exemplary embodiment shown in FIG. 3, the operator control element 5 is a lever element 10 which is mounted so as to be pivotable about a bearing point 9. The bearing point 9 can be located, for example, in the region of the center console or of the steering wheel. The lever element 10 is provided in the region of its free end with an operator control section 11 in the form of a translationally movable knob. The operator control section 11 is thus translationally movable from a home position or position of rest, in which it projects out of the free end of the lever element 10 by a first distance, into a first operator control position, in which it projects from the free end of the lever element 10 by, for example, a smaller distance compared to the first distance. The described movement of the operator control section 11 is typically carried out by applying a certain pressure to the operator control section 11, i.e. the operator control section 11 is pressed into the lever element 10.

The first operator control action is defined by a translational movement of the operator control section 11 (pressing) starting from the home position into the first operator control position. The longitudinal and/or transverse guidance is accordingly activated by pressing the operator control section 11 starting from a home position, which typically corresponds to the position of rest of the operator control section 11, into the first operator control position. By pivoting the lever element 10 about the bearing point 9 (cf. double arrow 12), with the operator control section 11 pressed, the second operator control action is defined so that in this way the driving parameter can be modified or influenced. Pivoting the lever element 10 upward (cf. dashed illustration) can bring about, for example, an increase in the driving parameter, i.e., for example, the velocity, and pivoting of the lever element 10 downward can bring about, for example, a reduction in the driving parameter, i.e., for example, the velocity.

In the exemplary embodiment shown in FIG. 4, the operator control element 5 is a smartphone or a tablet computer, referred to for short as tablet. The operator control element 5 is thus not a part of the motor vehicle 1 but instead is merely connected to the motor vehicle 1, i.e., in particular, the control device 3, via a suitable communication link, for example a wireless network link. The smartphone or the tablet computer is equipped with a touch-sensitive operator control surface 13 (touch screen) on which or by which corresponding operator control actions can be executed.

The first operator control action is defined, if appropriate after activation of a specific program which is installed on the operator control element side, by touching the operator control surface 13 with a finger, a pen or the like. It may be necessary here for a certain region on the operator control surface 13 to be touched (cf. region 14). The activation of the longitudinal and/or transverse guidance is thus carried out by touching the operator control surface 13 or the region 14 of the operator control surface 13. The second operator control action is defined by a movement ("wiping") of the finger, pen or the like, for example starting from the region 14, along or over the operator control surface 13 (cf. arrows 15), with the result that in this way the driving parameter can be modified or influenced. As is indicated by the different arrows 15, the movement can basically take place in any direction and in any form. For example, a movement or drawing of the finger upward or to the right can bring about an increase in the driving parameter, i.e., for example, the velocity, and a movement of the finger downward or to the left can bring about a reduction in the driving parameter, i.e., for example, the velocity.

As mentioned, the control information for the longitudinal and/or transverse guidance, generated by the operator control actions carried out on the operator control surface 13, is transferred to the control device 3. However, it is also conceivable to transfer only corresponding information which describes the operator control actions or movements carried out on the operator control surface 13 to the control device 3 and to process said information into corresponding control information for the longitudinal and/or transverse guidance, in the control device 3.

Figure 5:
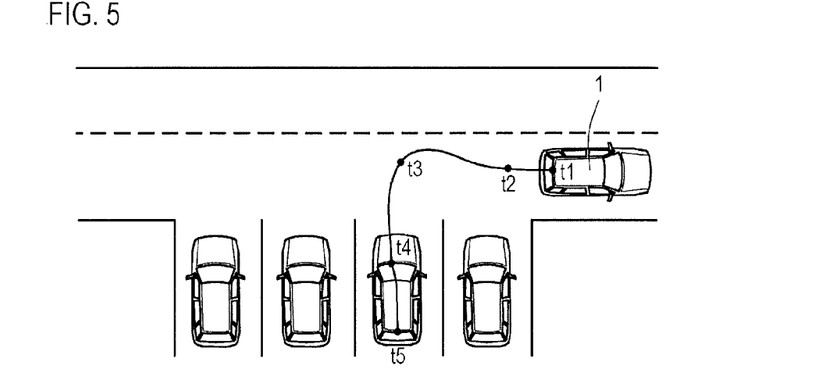
FIG. 5 shows a basic illustration of an automated parking process of a motor vehicle according to an exemplary embodiment.

FIG. 5 shows a basic illustration of an automated parking process of a motor vehicle 1 according to an exemplary embodiment. The parking process which is controlled by the control device 3 which controls the longitudinal and/or transverse guidance is divided into five successive points in time t1-t5. The point in time t1 corresponds to the home state of the motor vehicle 1 before the parking process which is carried out in an automated fashion. At the point in time t5, the parking process is concluded, and the motor vehicle 1 is located in the parking space, i.e. in a state in which it is parked correctly between other motor vehicles.

Figure 6:
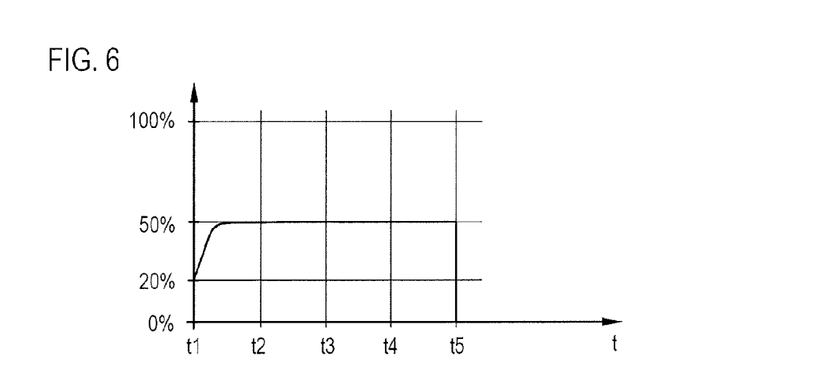
FIGS. 6 and 7 each show a diagram illustrating the profile of a second operator control action as a function of the time.
Figure 7:
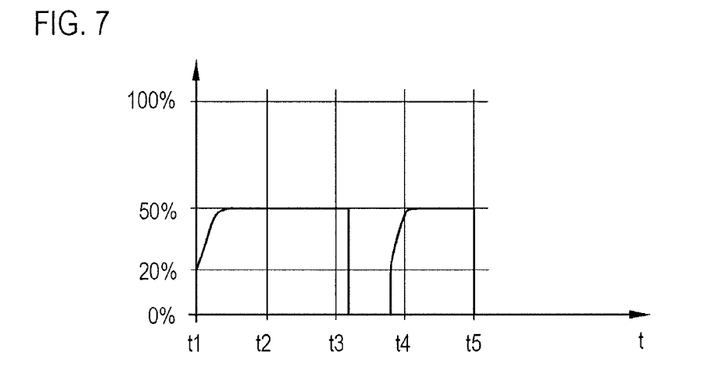
Figure 8:
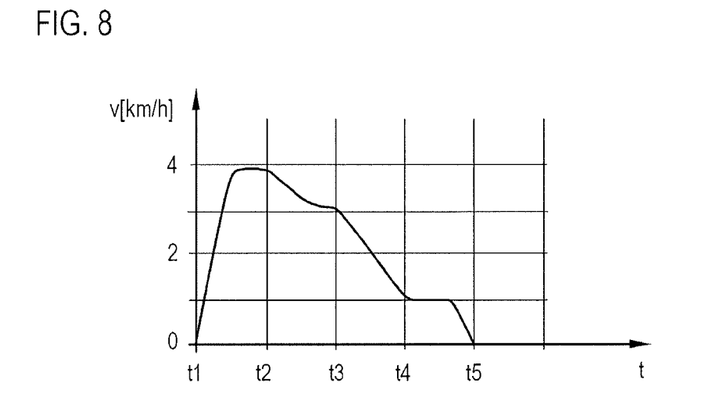
FIGS. 8 and 9 each show a diagram illustrating the profile of the velocity, correlated with the second operator control action in FIG. 6 or 7, as a function of the time.
Figure 9:
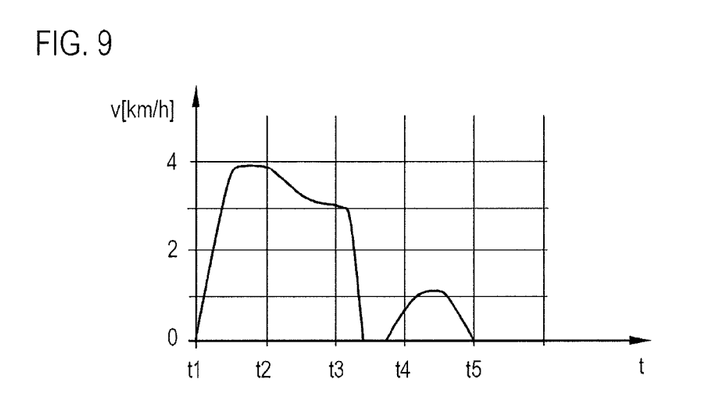

FIGS. 6 and 7 each show a diagram illustrating the profile of a second operator control action (y axis) as a function of the time (x axis). The y axis which represents the second operator control action is provided with a scale which specifies a specific percentage change in the driving parameter which can be modified or influenced with the second operator control action. FIGS. 8 and 9 each show a diagram illustrating the profile of the velocity of the motor vehicle 1 (y axis) as a function of the time (x axis), said velocity being correlated with the second operator control action in FIG. 6 or 7.

The points in time t1-t5 which are shown in FIG. 5 are each entered in the diagrams shown in FIGS. 6-9, with the result that a relationship can be recognized between the positions of the motor vehicle 1 during the automated parking process (cf. FIG. 5), the second operator control action (cf. FIGS. 6 and 7) and the velocity of the motor vehicle 1 within the scope of the automated parking process (cf. FIGS. 8 and 9).

The time profile of the velocity of the motor vehicle 1, shown in FIG. 8, is linked to the time profile of the second operator control action, shown in FIG. 6. The time profile of the velocity of the motor vehicle 1, shown in FIG. 9, is linked to the time profile, shown in FIG. 7, of the second operator control action. Two different, running parking processes are thus shown in FIGS. 6 and 8 and FIGS. 7 and 9.

The parking process illustrated in FIGS. 6 and 8 will be explained first. The operator activates the longitudinal and/or transverse guidance, controlled by the control device 3, of the motor vehicle 1 at the point in time t1 by a corresponding first operator control action and the control information which is associated therewith. The first operator control action can be, for example, pressing of the operator control element 5, i.e. a rotary-push actuator element, shown in FIG. 2. A preset value for the driving parameter which can be modified or influenced by the second operator control action is shown to be accepted by activating the longitudinal and/or transverse guidance. The value illustrated in FIG. 6 at the point in time t1 is 20%. Subsequently, the operator therefore basically has the possibility of increasing or decreasing the value which can be modified or influenced by the second operator control action. The parking process which is to be performed in an automated fashion therefore runs overall with a speed profile which is different compared to the speed profile which is defined by the preset value of 20%, said different speed profile being used as the basis for relatively high or relatively low velocities.

As is apparent from FIG. 8, between the points in time t1 and t2 the motor vehicle 1 firstly accelerates to a specific velocity, for example 2 km/h, which corresponds to the value of 20% shown in FIG. 6 or is correlated therewith.

The operator clearly intends to bring about an increase in the velocity within the scope of the longitudinal and/or transverse guidance in that between the points in time t1 and t2 said operator performs a second operator control action, i.e. referring again to the operator control element 5 shown in FIG. 2, and said operator rotates said operator control element 5 in the clockwise direction about the translational axis 6, which permits the value shown in FIG. 6 to increase from 20% to 50%. This entails a further acceleration of the motor vehicle 1 to a velocity of approximately 4 km/h. The automated longitudinal and/or transverse guidance of the motor vehicle 1 which is to be carried out by the control device 3 therefore proceeds with a speed profile which is different compared to the speed profile correlated with the setting of "20%" and has higher velocities.

As is apparent from FIG. 6, the operator does not change further the modification of the driving parameter which was performed by the second operator control action of the operator control element 5, i.e. said operator does not change further the increase in the velocity up to the end of the parking process, i.e. at the point in time t5. If the motor vehicle 1 is in a correctly parked state at the point in time t5, the operator releases the operator control element 5 and therefore deactivates the longitudinal and/or transverse guidance.

With reference to FIGS. 7 and 9 it will now be explained how the longitudinal and/or transverse guidance is carried out in the event of an incident, i.e., for example, an obstacle which suddenly appears in the path of the motor vehicle 1. The operator perceives the obstacle shortly after the point in time t3 and releases the operator control element 5, i.e. he cancels the first operator control action leading to the activation of said operator control element 5, for the purpose of immediately deactivating the longitudinal and/or transverse guidance. The cancelling of the first operator control action results in immediate braking of the motor vehicle 1 to the stationary state (cf. FIG. 9).

At a subsequent point in time, which occurs between the points in time t3 and t4 and at which the operator has, for example, assured himself that the obstacle does not pose a risk of a collision with the motor vehicle 1, the operator resumes the automated longitudinal and/or transverse guidance by carrying out the first operator control action at the operator control element 5. The y value which is shown in FIG. 7 assumes the presetting of 20% again. Through a second operator control action, the operator in turn increases the velocities on which the speed profile for the automated longitudinal and/or transverse guidance is based. The parking process or the longitudinal and/or transverse guidance is ended at the point in time t5, as is explained with reference to FIGS. 6 and 8.

For all the exemplary embodiments described in conjunction with FIGS. 1-9 it is the case that the operator control element 5 can comprise at least one output device, i.e., for example, a lighting device, a loudspeaker or a vibration device, for outputting acoustic and/or haptic and/or visual signals. It is alternatively or additionally also conceivable that the operator control element 5 is coupled, for the transfer of corresponding signals, to motor-vehicle-side output device by which acoustic and/or haptic and/or visual signals can be output, with the result that corresponding signals are not output at the operator control element 5 but instead by the motor vehicle 1. Feedback by a corresponding signal transfer can thus be provided to the operator, i.e. in particular to the driver, within the scope of the longitudinal and/or transverse guidance which takes place in an at least partially automated fashion.

The signals are particularly expediently output as a function of corresponding vehicle surroundings information. The signals can thus serve to warn the operator, i.e. in particular the driver, about possible hazardous situations. In this context, the intensity of the signals can be varied as a function of the vehicle surroundings information, i.e., for example, can increase with the criticality of the respective hazardous situation which is described by the vehicle surroundings information.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A motor vehicle comprising:
a control device which is designed to control at least partially automated longitudinal and/or transverse guidance for a driving maneuver of the motor vehicle; and
an operator control element to communicate with the control device and to transfer control information relating to the longitudinal and/or transverse guidance, to the control device, the control device being configured in such a way that activation or deactivation of the longitudinal and/or transverse guidance is controlled by an operator-side first operator control action at the operator control element, and a driving parameter which influences the longitudinal and/or transverse guidance is modified by an operator-side second operator control action which is different from the first operator control action, at the operator control element, wherein the motor vehicle further comprises at least one of the following to process vehicle surroundings information which is acquired by a vehicle surroundings sensor system and communicated with the control device:
a resetting device provided in the operator control element to provide a resetting force counter to the second operator control action, the resetting force being varied as a function of the vehicle surroundings information which is acquired during the driving maneuver, and
an output device to output feedback signals, the feedback signals being at least one of acoustic signals, haptic signals and visual signals, the output device being provided at or controlled by the operator control element, the feedback signals being output as a function of the vehicle surroundings information, the feedback signals having an intensity that is varied as a function of the vehicle surroundings information.

2. The motor vehicle as claimed in claim 1, wherein
the first operator control action is a translational movement of the operator control element along a translational axis starting from a home position into a first operator control position, and
the second operator control action is a rotational movement of the operator control element, located in the first operator control position, about the translational axis or another rotational axis.

3. The motor vehicle as claimed in claim 2, wherein
clockwise rotation of the operator control element increases the driving parameter, and
counter-clockwise rotation of the operator control element reduces the driving parameter.

4. The motor vehicle as claimed in claim 1, wherein
the first operator control action is a translational movement of the operator control element in an activation direction along a translational axis starting from a home position into a first operator control position, and
the second operator control action is a further translational movement of the operator control element in the activation direction along the translational axis starting from the first operator control position.

5. The motor vehicle as claimed in claim 1, wherein
the operator control element has an operator control section,
the first operator control action is a translational movement of the operator control section along a translational axis starting from a home position into a first operator control position, and
the second operator control action is a pivoting movement of the operator control element, when the operator control section is located in the first operator control position, about a bearing point starting from a home position.

6. The motor vehicle as claimed in claim 5, wherein
an upward pivoting of the operator control element toward the operator increases the driving parameter, and
a downward pivoting of the operator control element away from the driver decreases the driving parameter.

7. The motor vehicle as claimed in claim 1, wherein
the operator control element has a touch-sensitive operator control surface,
the first operator control action is a touch at a first operator control position on the operator control surface, and
the second operator control action is a movement along the operator control surface, starting from the first operator control position.

8. The motor vehicle as claimed in claim 1, wherein
the control device takes into account a limiting value for the driving parameter such that the driving parameter cannot be modified by the second operator control action to exceed the limiting value.

9. The motor vehicle as claimed in claim 8, wherein
the driving parameter is a velocity of the motor vehicle during the longitudinal and/or transverse guidance, and
the limiting value is a limiting velocity.

10. The motor vehicle as claimed in claim 9, wherein
the limiting velocity is adapted as a function of the vehicle surroundings information which is acquired during the driving maneuver.

11. The motor vehicle as claimed in claim 1, wherein
the driving parameter is a velocity or a speed profile of the motor vehicle during the longitudinal and/or transverse guidance.

12. The motor vehicle as claimed in claim 1, wherein
the operator control element is installed in the motor vehicle or in a smartphone.

13. The motor vehicle as claimed in claim 1, wherein
the control device is configured such that when the first operator control action is carried out, longitudinal and/or transverse guidance is activated using a predefined value of the driving parameter.

14. The motor vehicle as claimed in claim 1, wherein the motor vehicle comprises the resetting device.

15. The motor vehicle as claimed in claim 1, wherein the motor vehicle comprises the output device.

16. The motor vehicle as claimed in claim 1, wherein the motor vehicle comprises both the resetting device and the output device.

17. The motor vehicle as claimed in claim 1, wherein the driving maneuver is an automatic parking process, and the driving parameter is a velocity during the automatic parking process.

18. The motor vehicle as claimed in claim 1, wherein the motor vehicle comprises the resetting device, and
a higher resetting force is generated and applied to the operator control element when an increased collision probability is identified.

19. The motor vehicle as claimed in claim 1, wherein the motor vehicle comprises the output device, and
the intensity of the feedback signals is increased when a hazard for the motor vehicle is identified.

20. The motor vehicle as claimed in claim 1, wherein the resetting force and/or the intensity of the output signals is increased if the operator attempts to increase the driving parameter beyond what is considered safe in a traffic situation.

21. The motor vehicle as claimed in claim 1, wherein the longitudinal and/or traverse guidance of the motor vehicle is deactivated by cancelling the first operator control action such that the driving maneuver is ended when the operator control element is released.

22. A method for operating a motor vehicle, comprising:
controlling at least partially automated longitudinal and/or transverse guidance for a driving maneuver of the motor vehicle, the longitudinal and/or transverse guidance being controlled by a control device;
communicating between an operator control element and the control device;
transferring control information, relating to the longitudinal and/or transverse guidance, from the operator control element to the control device;
activating or deactivating the longitudinal and/or transverse guidance by an operator-side first operator control action at the operator control element;
modifying a driving parameter which influences the longitudinal and/or transverse guidance by an operator-side second operator control action which is different from the first operator control action, at the operator control element; and
acquiring vehicle surroundings information by a vehicle surroundings sensor system that communicates with the control device, wherein the method further comprises at least one of the following:
providing a resetting force by a resetting device provided in the operator control element, the resetting force being counter to the second operator control action, the resetting force being varied as a function of vehicle surroundings information which is acquired during the driving maneuver, and
outputting feedback signals by an output device, the feedback signals being at least one of acoustic signals, haptic signals and visual signals, the output device being provided at or controlled by the operator control element, the feedback signals being output as a function of the vehicle surroundings information, the feedback signals having an intensity that is varied as a function of the vehicle surroundings information.

* * * * *